United States Patent [19]
Heung et al.

[11] Patent Number: 5,965,482
[45] Date of Patent: Oct. 12, 1999

[54] COMPOSITION FOR ABSORBING HYDROGEN FROM GAS MIXTURES

[75] Inventors: Leung K. Heung; George G. Wicks; Myung W. Lee, all of Aiken, S.C.

[73] Assignee: Westinghouse Savannah River Company, Aiken, S.C.

[21] Appl. No.: 09/094,293

[22] Filed: Jun. 9, 1998

[51] Int. Cl.$^6$ ........................................ B01J 20/02
[52] U.S. Cl. .......................... 502/406; 516/111; 423/248
[58] Field of Search .............................. 420/900; 423/248, 423/648.1; 502/405, 406, 407; 516/85, 82, 111

[56] References Cited

U.S. PATENT DOCUMENTS

| | | | |
|---|---|---|---|
| 4,036,944 | 7/1977 | Blytas | 423/658.2 |
| 4,110,425 | 8/1978 | Bühl et al. | 423/658.2 |
| 4,433,063 | 2/1984 | Bernstein et al. | 423/648 X |
| 5,411,928 | 5/1995 | Heung et al. | 502/407 |

*Primary Examiner*—Michael Lewis
*Assistant Examiner*—Stuart Hendrickson
*Attorney, Agent, or Firm*—Dority & Manning

[57] ABSTRACT

A hydrogen storage composition is provided which defines a physical sol-gel matrix having an average pore size of less than 3.5 angstroms which effectively excludes gaseous metal hydride poisons while permitting hydrogen gas to enter. The composition is useful for separating hydrogen gas from diverse gas streams which may have contaminants that would otherwise render the hydrogen absorbing material inactive.

14 Claims, No Drawings

COMPOSITION FOR ABSORBING HYDROGEN FROM GAS MIXTURES

The present invention relates to hydrogen absorption. More particularly, the present invention relates to compositions for absorbing or storing hydrogen. The United States Government has rights in this invention pursuant to Contract No. DE-AC09-96SR18500 between the U.S. Department of Energy and Westinghouse Savannah River Company.

FIELD OF THE INVENTION

DISCUSSION OF BACKGROUND

Hydrogen-absorbing materials are used in many applications, including processes involving the storage, recovery and supply of hydrogen. Industries such as hydrogen processing and energy conversion use such materials in hydrogen purification and separation processes.

Hydrogen energy sources are widely viewed and promoted as a clean, renewable energy source. Accordingly, improved and more efficient ways to produce, store, and transport hydrogen are needed.

Various metals and metal alloys can absorb and then desorb large amounts of hydrogen under appropriate temperature and pressure conditions. These materials are referred to as metal hydrides and are well known in the art. They include pure metals such as Mg, Pd, Ti, Pt, U, and alloys such as those based on nickel, lanthanum and aluminum.

Metal hydrides are used in many different forms. Although frequently used in the form of granules, metal hydrides are sometimes incorporated into a matrix such as a polymer. (See, for example, U.S. Pat. No. 4,110,425, issued to Bühl et al.)

Similarly, porous polymeric matrices are used as media for supporting metal hydrides and other hydrogen-absorbing materials because of the increased surface area and corresponding increase in the amount of hydrogen that can be absorbed in a given volume. Such compositions are disclosed in U.S. Pat. Nos. 4,433,063, issued to Bernstein et al, and 4,036,944, issued to Blytas.

U.S. Pat. No. 5,411,928, incorporated herein by reference, discloses a hydrogen-absorbing composition prepared by a sol-gel process. In that application, a sol is prepared from an organometallic compound, such as tetraethoxysilane, and mixed with hydride particles. The mixture is allowed to polymerize and then to cure to form a highly porous matrix having hydride particles dispersed throughout. The resulting composition has pores large enough to allow gases to pass through the matrix, yet small enough to hold the particles in place during repeated hydrogen absorption/desorption cycles without having significant breakdown and consequent release of the hydride particles into the process stream.

However, there remains a need within the art for a hydrogen separation and storage apparatus and process which is compatible with separating hydrogen from diverse gas streams such as refinery gas or industrial waste gas streams. Often these sources contain metal hydride poisons such as CO or $H_2S$ which render the metal hydrides unusable. The prior art fails to provide a metal hydride separation technology capable of directly and selectively removing hydrogen from gas streams containing metal hydride poisons.

SUMMARY OF THE INVENTION

According to its major aspects and broadly stated, the present invention is a composition for absorbing hydrogen. In particular, it is a porous glass matrix, made by a sol-gel process, in which the reaction parameters are selected to produce a matrix which permits hydrogen absorption to occur from gas streams having known metal hydride poisons such as CO and $H_2S$. Heretofore it has not been possible to provide a reusable metal hydride-containing matrix to absorb hydrogen from gas streams containing metal hydride poisons.

A major feature of the present invention is the formation of a glass matrix in which the pore size has a high degree of uniformity. In particular, the pore size permits the free passage of hydrogen gas to occur, while excluding certain other gaseous molecules such as metal hydride poisons $H_2S$, and CO.

The matrix made according to the present invention is extremely porous and has a very high surface area-to-volume ratio. It is chemically and physically stable and holds the hydride particles securely. Thus, it enables the absorption of large amounts of hydrogen by the hydride over repeated cycles of use while the matrix physically excludes gaseous poisons.

Other features and advantages of the present invention will be apparent to those skilled in the art from a careful reading of the Detailed Description of a Preferred Embodiment presented below.

DETAILED DESCRIPTION OF A PREFERRED EMBODIMENT

The hydrogen-absorbing composition in its preferred embodiment is prepared by a method generally as follows. A first solution (solution A) is prepared by mixing an alcohol such as ethanol and water at a ratio of 1 part ethanol to 2.7 parts water by volume. Drops of hydrochloric acid are added to the solution to reach a pH value of 1.6. A second solution (solution B) is prepared by mixing alcohol (ethanol) and tetraethyl orthosilicate (TEOS) at a ratio of 1 part ethanol to 2 parts TEOS by volume.

Solution A is slowly added to solution B with continuous mixing. The combined solutions are continuously mixed for about 30 minutes until a sol is achieved.

To the sol solution, metal particles are added which have been prepared as follows. A metal alloy, such a LaNi0.25Al0.75 or other metal hydride is repeatedly reacted with hydrogen in a cyclic process which results in the production of a metal hydride fines. In the present embodiment, the desired alloy fines have a particle size of less than 45 microns. The fines/particles are slowly exposed to air and surface oxidized until a thin layer of metal oxide has slowly formed on the surfaces of the metal fines. The surface oxidation prevents further oxidation of the inner portions of the metal particles. The oxidation is done at a slow, controlled rate to prevent the entire particle from becoming oxidized which renders the material useless for hydrogen absorption. Once the controlled oxidation has occurred, the metal particles are stable in the presence of air and can be easily handled for use in the composition of the present invention.

The metal hydride particles described and prepared above, are added to the sol at a ratio of about 20 grams of metal to 240 cc of sol. The mixture is placed on a rotating mixer which maintains the metal particles in a suspension within the sol. The mixing continues for about 24 hours until the sol has solidified.

The solidified sol-gel with the dispersed metal hydride particles is removed from the mixer and placed in a sealed container for about 10 days. During the 10 day seasoning time, a liquid phase gradually appears. Following seasoning, the seal is removed and the liquid is allowed to evaporate at room temperature.

Following evaporation of the liquid phase, the remaining solid product is vacuum dried at ambient temperature to remove any residual volatile compounds. While under vacuum, the temperature is increased to 300° C. over a 30 minute time interval (curing) which is maintained along with the negative pressure for two hours. The heat treated material, hereinafter "composite", is allowed to cool to room temperature. Following cooling, the composite is mechanically broken to a useful size range of final product which is between 20 to 8 mesh (0.5 to 1 mm particle size). The final product can then be used in a conventional gas separation column or apparatus to remove hydrogen gas from a gas stream.

The composite provided above is useful for absorbing hydrogen from gas streams which contain known metal hydride gaseous poisons. Set forth in Table 1 is data showing the relative absorption of the composite to pure metal hydride in both a pure hydrogen stream and a hydrogen stream containing 10 mol% CO. As seen, the presence of CO had no effect on the composition's ability to absorb hydrogen. As seen in the pure metal hydride control, the level of CO typically acts as a complete poison, rendering the metal hydride incapable of hydrogen absorption.

TABLE 1

| Atom/Metal Atom | Hydrogen Absorption Capacity, (H | |
| --- | --- | --- |
| in Hydrogen Feed | Pure Hydrogen Feed | 10 mol % CO |
| Product of this invention | 0.5 | 0.5 |
| Pure metal (LaNi$_{0.25}$Al$_{0.75}$) | 0.7 | 0.0 |

As seen in reference to Table I, a composition made according to the present invention has to ability to exclude low molecular weight gases such as H$_2$S and CO. It is also noted that the total storage capacity for hydrogen gas of the present invention, compared to an equal quantity of pure metal hydride, is decreased. It is postulated that the decrease in absorption capacity of the composition reflects the fact that a certain percentage of the matrix defines a pore size which actually excludes the passage of hydrogen gas. As a result, some of the metal hydride is not available to react with hydrogen gas.

However, as seen by the data in Table I, the composition is able to exclude CO from the H2/CO gas mixture. This data demonstrates that the composition defines an overall matrix pore size sufficiently small that no detectable CO or other metal hydride poison can pass through the matrix to the metal hydride. At the same time, a large percentage of the matrix enables hydrogen gas to pass through as seen by the absorptive data.

While the actual pore size has not been measured, it is noted that the hydrogen gas molecule is significantly smaller than any of the gaseous poisons evaluated above. It is believed that the porous glass matrix has pores which average less than 3.5 angstroms in size. The reaction conditions and resulting compositions result in a composition able to exclude non-hydrogen gases which would otherwise react with the metal hydride component of the composition. While data is shown only for CO, the present invention has been found useful for excluding other gaseous impurities such as oxygen and hydrogen sulfide.

It has been found that the process parameters can be varied to achieve different pore sizes and physical properties of the resulting composition.

In general, processes which increase the gelation time tend to decrease the pore size. Accordingly, A balance must be obtained between too little and too great a gelation time. If a too large average pore size is obtained, the matrix will not exclude the metal hydride poisons. One such factor effecting the porosity is the ratio of the ethanol. If the percentage of ethanol in the ethanol-to- water ratio is increased, a more rapid gellation occurs and results in increased pore size. In addition, PH conditions can be adjusted to increase the gellation time which results in decreasing the average pore size of the resulting composition.

The seasoning duration has been found to affect the physical strength of the resulting composition. The longer the seasoning time, the greater the physical strength of the resulting composition is. Conversely by increasing the percentage of metal in the metal:sol ratio result in a structurally weaker composition. However, it is not believed to affect the pore size of the matrix.

It has also been noted that increasing the H$_2$O in the H$_2$O: TEOS ratio results in a larger pore size by lowering the overall bulk density of the resulting component. The heat treatment curing conditions also have an effect on the composition properties. In general, it has been observed that increasing the curing temperature or curing time results in a smaller pore size as determined by loss of hydrogen absorption capacity of the resulting composition compared to a control amount of the pure metal hydride. Therefore, over-curing the material should be avoided.

In keeping with the above general observations, a variety of effective compositions can be created by varying the above process parameters. The effect of such variations can be easily determined by evaluating the ability of the resulting composition to bind hydrogen gas relative to a controlled amount of pure metal hydride and in further comparison to the ability to exclude a hydride poison from a mixed gas stream.

For the first time applicant's invention provides a composition comprising a metal hydride which is capable of hydrogen separation from feeds which heretofore rendered the metal hydride ineffective. The composition of the present invention suspends the metal hydride within a sol-based matrix. The matrix is formed under special conditions which establish a physical barrier defined by the matrix. The metal hydride is safely encapsulated within the matrix, where the matrix pore size prevents small gaseous poisons such as CO or H$_2$S from entering.

A useful metal hydride is LaNi$_{4.25}$Al$_{0.75}$ and variations of the general formula LaNi$_{5-x}$Al$_x$ where X:0–1. Alternative metal hydrides include palladium, platinum, lanthanum, nickel, aluminum, titanium, vanadium, iron, zirconium, cobalt and combinations thereof such as various lanthanum-nickel-aluminum alloys and alloys of V—Ti—Fe, and Ti—Fe. LA may be replaced with other rare earth compounds from the same series or in combinations thereof. The particle size of the metal hydride to be used is preferably less than approximately 45 μm in size. A particle size of approximately 10 μm results in a stronger final product.

It will be apparent to those skilled in the art that many changes and substitutions can be made to the preferred embodiment herein described without departing from the spirit and scope of the present invention as defined by the appended claims.

What is claimed is:

1. A composition for absorbing hydrogen, said composition made by a process comprising the steps of:

adding a hydrogen absorber to a sol;

agitating said sol to disperse said hydrogen absorber throughout said sol;

gelling said sol to form a gel with said hydrogen absorber dispersed throughout said gel; and seasoning said gel in a sealed container until a liquid phase has formed; and heat treating said gel to form a porous glass matrix with said hydrogen absorber dispersed throughout, said matrix defining an average pore size sufficient to admit hydrogen gas while excluding gaseous metal hydride poisons.

2. The composition as recited in claim 1, wherein said sol is made by the process comprising the steps of:

mixing ethanol and water to form a first mixture;

mixing ethanol and tetraethyl orthosilicate to form a second mixture; and slowly adding said first mixture to said second mixture to form said sol.

3. The composition as recited in claim 1, wherein said hydrogen absorber further comprises a metal hydride in the form of particles.

4. The composition as recited in claim 1, wherein said hydrogen absorber is selected from the group consisting of lanthanum, nickel, aluminum, platinum, and combinations thereof.

5. The composition as recited in claim 1, wherein said hydrogen absorber is $LaNi_{4.25}Al_{0.75}$.

6. The composition as recited in claim 1, wherein said hydrogen absorber is in the form of particles, each particle being less than approximately 45.0 μm in size.

7. The composition as recited in claim 1, wherein said porous glass matrix has pores less than approximately 3.5 angstroms in size.

8. A composition for absorbing hydrogen, said composition comprising:

a porous glass matrix having an average pore size sufficient to admit hydrogen gas while excluding gaseous poisons;

particles of a hydrogen absorbing material distributed throughout said glass matrix and in communication with said pores.

9. The composition as recited in claim 8, wherein said material is selected from the group consisting of palladium, platinum, lanthanum, nickel, aluminum, titanium, vanadium, iron, zirconium, cobalt and combinations thereof.

10. The composition as recited in claim 8, wherein said material is $LaNi_{4.25}Al_{0.75}$.

11. The composition as recited in claim 8, wherein said material is a metal hydride.

12. The composition as recited in claim 8, wherein said composition is made by the process comprising the steps of:

mixing ethanol and water to form a first mixture;

mixing ethanol and tetraethyl orthosilicate to form a second mixture;

slowly adding said first mixture to said second mixture to form a sol;

mixing said particles with said sol;

agitating said sol to disperse said particles throughout said sol;

gelling said sol to form a gel with said particles dispersed throughout said gel; and gelling said sol to form a gel with said hydrogen absorber dispersed throughout said gel; and seasoning said gel in a sealed container until a liquid phase has formed heat treating said gel to form a porous glass matrix with said hydrogen absorber dispersed throughout.

13. The composition as recited in claim 8, wherein said particles are less than approximately 45.0 μm in size.

14. The composition as recited in claim 12, wherein said porous glass matrix has an average of pores less than approximately 3.5 angstroms in size.

\* \* \* \* \*